United States Patent
Bankston et al.

(10) Patent No.: US 11,663,590 B2
(45) Date of Patent: May 30, 2023

(54) PRIVACY-PRESERVING ASSERTION SYSTEM AND METHOD

(71) Applicant: Visa International Service Association, San Francisco, CA (US)

(72) Inventors: Michael Steven Bankston, Oakland, CA (US); Erik Christopher Friend, Mountain View, CA (US); Jerry Wald, San Francisco, CA (US)

(73) Assignee: VISA INTERNATIONAL SERVICE ASSOCIATION, San Francisco, CA (US)

(\*) Notice: Subject to any disclaimer, the term of this patent is extended or adjusted under 35 U.S.C. 154(b) by 40 days.

(21) Appl. No.: 17/264,075

(22) PCT Filed: Mar. 15, 2019

(86) PCT No.: PCT/US2019/022507
§ 371 (c)(1),
(2) Date: Jan. 28, 2021

(87) PCT Pub. No.: WO2020/027879
PCT Pub. Date: Feb. 6, 2020

(65) Prior Publication Data
US 2021/0374728 A1     Dec. 2, 2021

Related U.S. Application Data

(60) Provisional application No. 62/713,461, filed on Aug. 1, 2018.

(51) Int. Cl.
*G06Q 20/38* (2012.01)
*G06F 21/62* (2013.01)
(Continued)

(52) U.S. Cl.
CPC ....... *G06Q 20/385* (2013.01); *G06F 21/6245* (2013.01); *G06Q 20/02* (2013.01);
(Continued)

(58) Field of Classification Search
None
See application file for complete search history.

(56) References Cited

U.S. PATENT DOCUMENTS 8,725,638 B2   5/2014  Pirzadeh et al.
2005/0261926 A1\*  11/2005  Hartridge ............... G06Q 40/02
                                                              705/1.1
(Continued)

FOREIGN PATENT DOCUMENTS

WO  2016/043826 A1  3/2016
WO  2018/063167 A1  4/2018

OTHER PUBLICATIONS

Rubio-Medrano, C., Ahn, G., & Sohr, K. (2015). Achieving security assurance with assertion-based application construction. EAI Endorsed Transactions on Collaborative Computing, 1(6), n/a. doi:http://dx.doi.org/10.4108/eai.21-12-2015.150819 on Dec. 23, 2022 (Year: 2015).\*

(Continued)

*Primary Examiner* — Kito R Robinson
(74) *Attorney, Agent, or Firm* — Kilpatrick Townsend & Stockton LLP

(57) ABSTRACT

Disclosed are methods and systems for enabling a package of assertions to be provided to a relying entity seeking to interact with an account. A server computer may receive, from a relying entity, a request for assertions, wherein the request for assertions includes an identifier of the relying entity and a hash of an identifier of an account. The server computer may determine an assertions model based on the identifier of the relying entity. The server computer may (Continued)

retrieve a package of assertions associated with the account based on the assertions model and the hash of the identifier of the account. The server computer may transmit the package of assertions to the relying entity.

20 Claims, 7 Drawing Sheets

(51) Int. Cl.
    *G06Q 20/02*     (2012.01)
    *G06Q 20/40*     (2012.01)
    *G06Q 40/02*     (2023.01)

(52) U.S. Cl.
    CPC ..... *G06Q 20/3827* (2013.01); *G06Q 20/4014* (2013.01); *G06Q 40/02* (2013.01)

(56) References Cited

U.S. PATENT DOCUMENTS

| | | |
|---|---|---|
| 2010/0274692 A1 | 10/2010 | Hammad |
| 2014/0236763 A1 | 8/2014 | Wilf et al. |
| 2017/0250972 A1* | 8/2017 | Ronda ................ H04L 63/0428 |
| 2017/0337550 A1* | 11/2017 | Aparicio Ruiz ... G06Q 20/3829 |
| 2018/0025140 A1* | 1/2018 | Edelman ............ G06Q 20/4016 726/7 |
| 2019/0149524 A1* | 5/2019 | Bankston ............ H04L 63/0421 726/26 |

OTHER PUBLICATIONS

International Search Report and Written Opinion for Application No. PCT/US2019/022507 dated Jun. 26, 2019, 16 pages.

Grassi et al. "NIST Special Publication 800-63A, Digital Identity Guidelines: Enrollment and Identity Proofing", U.S. Department of Commerce (updated Nov. 15, 2017), available at https://doi.org/10.6028/NIST.SP.800-63a, 47 pages.

* cited by examiner

PRIVACY-PRESERVING ASSERTION SYSTEM AND METHOD

CROSS-REFERENCE TO RELATED APPLICATIONS

This application is a 371 National Phase application of International Application No. PCT/US2019/022507, filed Mar. 15, 2019, which claims the benefit of U.S. Provisional Application No. 62/713,461, filed Aug. 1, 2018, which are incorporated herein by reference, including any appendices therewith.

BACKGROUND

Transfer of a resource is preferably achieved after first establishing validity of the destination. For example, if a payer seeks to transfer money to a payee, the authenticity of the payee's payment account should first be established. Traditionally, one way of verifying an account has been to attempt to deposit a trivial amount, such as forty-three cents, into the payee's account. The payee may then be asked to provide the deposit amount, for validating that the amount was deposited in the right account. This approach may work for the case that a payee supplies the wrong number or identifier associated with the payment account (e.g., one of the nine digits of an account number is wrong). However, this traditional approach may not be as effective for safeguarding against man-in-the-middle attacks, in which a payee may supply a number of a payment account to receive funds, but that transmission could be intercepted by a malicious third-party who replaces the account number with their own. In both cases, any transferred money has the potential to end up in the wrong account.

For security reasons, it may be undesirable for the receiving entity to have access to personally identifying information of a target entity, such as the account number of the payee described above. If the receiving entity is not trustworthy, or the account number is intercepted, then the account number can be used in a fraudulent manner.

For the target entity for which data is being requested, high-friction experiences are common. For example, if a customer needs to prove her identity and income level, she may have to gather and validate several official documents. Not only is gathering this information inconvenient and error-prone, but it creates an unnecessary risk of identity fraud, as the customer is presenting private documents to the entities seeking information.

Embodiments of the disclosure address these and other problems individually and collectively.

BRIEF SUMMARY

Embodiments of the disclosure include methods as well as systems for validating an account for receiving a deposit, based on one or more assertions.

One embodiment of the disclosure is directed to a method comprising: receiving, by a server computer from a relying entity, a request for assertions, wherein the request for assertions includes an identifier of the relying entity and a hash of an identifier of an account; determining, by the server computer, an assertions model based on the identifier of the relying entity; retrieving, by the server computer, a package of assertions associated with the account based on the assertions model and the hash of the identifier of the account; and transmitting, by the server computer, the package of assertions to the relying entity.

Another embodiment of the disclosure is directed to a system comprising a server computer programmed to perform the above-noted method.

Another embodiment of the disclosure is directed to a method comprising: transmitting, by a client computer of a relying entity to a server computer, a request for assertions, wherein the request for assertions includes an identifier of the relying entity and a hash of an identifier of an account; and receiving, from the server computer, a package of assertions associated with the account, wherein the package of assertions was retrieved by the server computer based on the hash of the identifier of the account and an assertions model determined by the server computer based on the identifier of the relying entity.

Another embodiment of the disclosure is directed to an system comprising a client computer programmed to perform the above-noted method.

Further details regarding various embodiments can be found in the Detailed Description and the Figures.

BRIEF DESCRIPTION OF THE DRAWINGS

The example embodiment(s) of the present disclosure are illustrated by way of example, and not in way by limitation, in the figures of the accompanying drawings and in which like reference numerals refer to similar elements and in which.

Figure 1A:
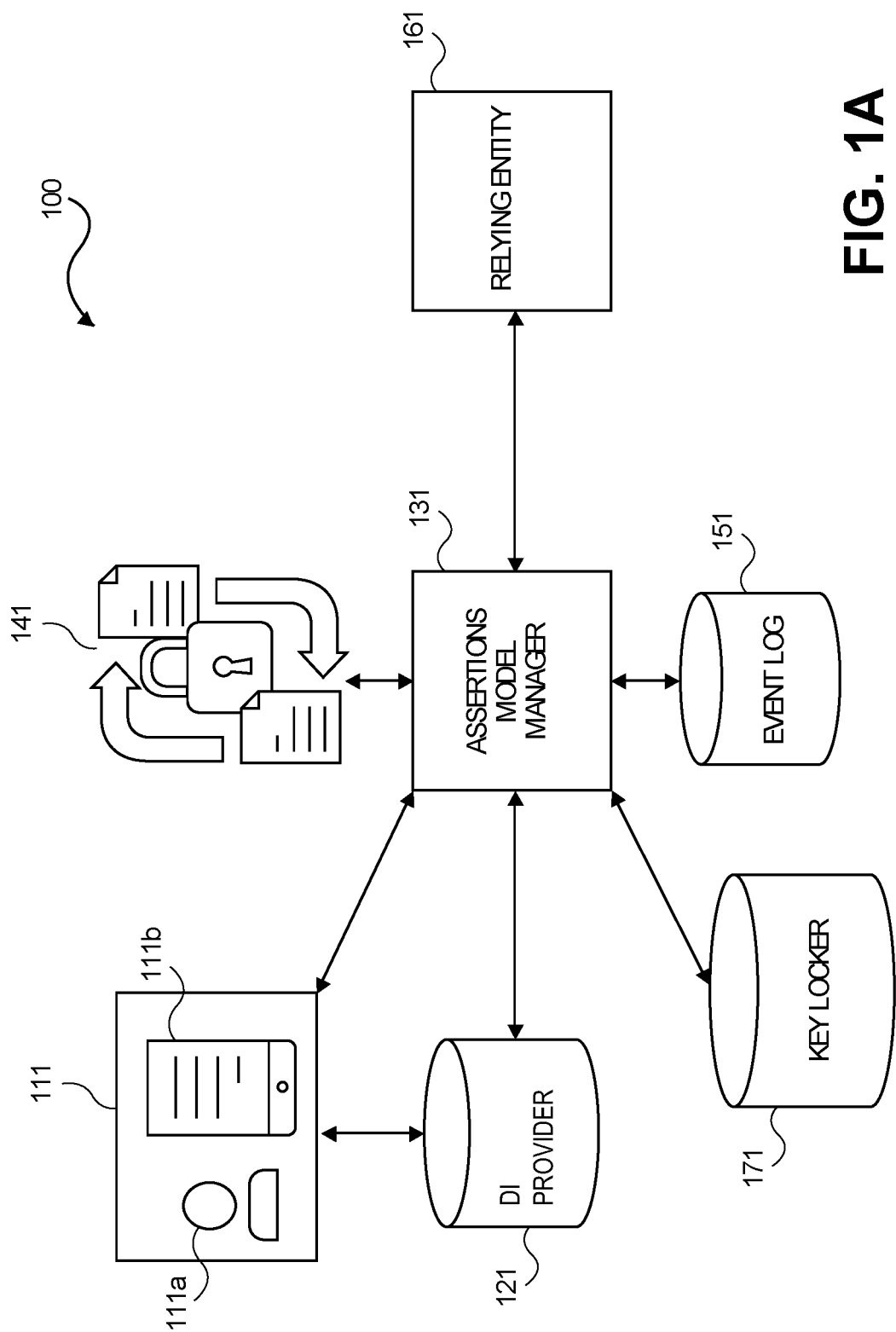
FIG. 1A is a schematic diagram of a system for providing at least one assertion according to a non-limiting embodiment.

While each of the figures illustrates a particular embodiment for purposes of illustrating a clear example, other embodiments may omit, add to, reorder, and/or modify any of the elements shown in the figures.

DETAILED DESCRIPTION

Definitions

Prior to discussing various embodiments, some terms can be described in further detail.

The term "identifier" may refer to any information that may be used to identify something. In some embodiments, the identifier may be a special value generated randomly or according to a predetermined algorithm, code, or shared secret. For example, an individual may be identified using a driver's license number or a cryptographic key. In some embodiments, the identifier may be in the form of one or more graphics, a token, a bar code, a quick response (QR) code, or any other information that may be used to uniquely identify an entity.

An "identity attribute" may refer to a particular piece of information about an entity (e.g., person, organization, thing, or the like). Examples of identity attributes include a social security number, an age, a phone number, and a bank account number associated with a person.

A "digital identity" (DI) may include a secure set of information about an entity (e.g., a person, organization, or thing). A DI may comprise a plurality of identity attributes, as well as a digital identity identifier that identifies the digital identity. For example, a DI for a user, Joe Smith, may include identity attributes such as the user's date of birth, social security number, address, and driver's license number, as well as an identifier such as Joe_Smith_1234 which is used to identify Joe Smith's digital identity. The DI may be made available to another entity in a secure manner. DIs may rely on agreements among stakeholders and security measures such as cryptography.

An "assertion" (sometimes referred to as an "assertion value") may refer to a secure fact about an entity. An assertion can protect information while being useful to achieve a particular goal. For example, an assertion may specify something about an entity, such as whether the entity should be allowed to purchase alcohol in a particular location. The assertion may be "Jane Doe is old enough to purchase alcohol in California." This assertion can be used by a bar in determining whether to serve alcohol to a person, instead of conveying the person's driver's license information to the bar. As another example, an assertion may specify whether an entity has an account which can accept deposits (e.g., "Jane Doe has a bank account and can accept deposits.").

A "type of assertion" may be a category of assertions, e.g., whether an entity has at least $100 in a bank account. The "assertion" or "assertion value" associated with the type of assertion may be a corresponding answer for a particular entity, which may in the form of "yes" or "no," or may be an affirmative statement (e.g., "Jane Doe has $100 or more in her bank account."). An assertion may be secured cryptographically. An assertion may be digitally signed by the entity of interest and/or the trusted party providing the secure facts.

An "assertions model" may be a set of assertion types that may be associated with a particular entity. An assertions model may specify one or more types of assertions. For example, an assertions model may include two types of assertions: whether an entity is old enough to rent a car and whether the entity has a valid driver's license. An assertions model may be tailored to a particular situation. Continuing with the previous example, whether an entity is old enough to rent a car and whether the entity has a valid driver's license may correspond to an assertions model for the context of a prospective car renter interacting with a rental car agency.

A "target entity" may refer to an entity corresponding to an assertion, DI, and/or identity attribute. For example, a target entity may be Mary Jones. An assertion about Mary Jones may specify whether Mary Jones is old enough to purchase alcohol in a particular location. A related identity attribute for Mary Jones may be Mary Jones's exact age (e.g., 35 years old).

A "relying entity" may refer to an entity that may receive an assertion, DI, and/or identity attribute. For example, the relying entity may be a bar that requests an assertion whether a target entity is old enough to be served alcohol.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "public key" may include a cryptographic key that that forms a public key of a public/private key pair. The public key may be designed to be shared (e.g., transmitted between entities) and may be configured such that any information encrypted with the public key may only be decrypted using a private key associated with the public key.

A "private key" may include a cryptographic key that forms a private key of a public/private key pair. A private key may be used to decrypt data encrypted with a public key.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram.

A "hash" may refer to a fixed-length output of a hashing algorithm. Such an output may be generated based on an input string of any length. Some hashes may be generated and reversed cryptographically. Hashes may be stored associatively to a hash table, which may accelerate table lookup or data comparison tasks such as finding items in a database.

A "distributed ledger" may refer to a database that is shared among multiple nodes across a network. Entities corresponding to each node may store identical copies of the ledger at a given time. The entities may have permission to make changes or additions to the ledger. When the ledger is changed, the participating entities may receive the updated ledger. Examples of distributed ledgers include a blockchain, wherein transactions are verified before being encrypted and recorded to the ledger in a block of transactions.

The term "message" may include any data or information that may be transported from one entity to another entity (e.g., one computing device to another computing device). Messages may be communicated internally between devices/components within a computer or computing system or externally between devices over a communications network. Additionally, messages may be modified, altered, or otherwise changed to comprise encrypted or anonymized information.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer-readable medium that stores instructions that can be executed by a processor to implement a desired method. Examples of memories may comprise one or more memory chips, disk drives, etc. Such memories may operate using any suitable electrical, optical, and/or magnetic mode of operation.

As used herein, the terms "client" and "client device" may include one or more client-side devices or systems, remote from a transaction service provider, used to initiate or facilitate a transaction. As an example, a "client device" may include one or more POS devices and/or POS systems used by a merchant. It will be appreciated that a client device may be any electronic device configured to communicate with one or more networks and initiate or facilitate transactions such as, but not limited to, one or more computers, portable computers, tablet computers, cellular phones, wearable devices (e.g., watches, glasses, lenses, clothing, and/or the like), PDAs, and/or other like devices. Moreover, a "client" may also refer to an entity, such as a merchant, that owns, utilizes, and/or operates a client device for initiating transactions with a transaction service provider.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

Systems

Referring now to FIG. 1A, a schematic diagram of an example system 100 for providing at least one assertion is shown according to a non-limiting embodiment. System 100 illustrates only one of many possible arrangements of components configured to execute the programming described herein. Other arrangements may include fewer or different components, and the division of work between the components may vary depending on the arrangement.

The system 100 can include a DI provider 121, an assertions model manager 131, a relying entity 161, an event log 151, a ledger of assertions 141, a target entity 111, and a key locker 171. The components of the system 100 may all be in operative communication with each other through a communication network.

The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the entities, providers, networks, and devices illustrated in FIG. 1A may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), International Organization for Standardization (ISO, e.g., ISO 8583) and/or the like.

The target entity 111 may be an entity for which one or more assertions are provided (i.e., the assertions are about the target entity 111). The target entity 111 may include a user 111A and/or a client device 111B of the target entity. As used herein, the term "target entity" may refer to an individual (e.g., a customer, a consumer, and/or the like), a business or other legal organization, a government agency, and/or the like. The assertions may relate to an account of the target entity 111. The account may be a payment account (e.g., checking, savings, credit, etc.).

In some non-limiting embodiments, the target entity 111 may be assigned an identifier ("an identifier of the target entity"). The identifier of the target entity may include data associated with a digital signature and/or cryptographic key of the target entity 111. Alternatively, or additionally, the identifier of the target entity may include an ID number, a QR code, and/or the like.

The DI provider 121 may manage one or more digital identities (DIs) associated with a target entity 111. As described above, a DI can include data associated with a set of information about an entity that can be shared with another entity. The DI provider may be an issuer, an acquirer, a transaction service provider, a government agency, and/or the like. The DI provider 121 is configured to create and store DIs. The DI provider may provide information about a target entity and/or an account.

The DI provider 121 may be an authorizing entity, which manages an account associated with the target entity. The authorizing entity may, for example, be an issuing bank. The target entity 111 may have one or more accounts, such as a checking account and/or line of credit, with the DI provider 121. The DI provider 121 may provide information about an account and/or the target entity 111.

The DI provider 121 may retrieve data from another source. Such a primary source of information is referred to herein as a reference. References are generally trusted sources of information. A reference may be a verified document (e.g., a birth certificate, driver's license, password, credit card, etc.). Alternatively, or additionally, a reference may be an entity, such as a government agency, bank, individual, etc., that can provide trusted information.

The DI provider 121 may be assigned an identifier ("an identifier of the DI provider"). The identifier of the DI provider 121 may include data associated with a digital signature and/or cryptographic key of the DI provider 121.

The relying entity 161 is an entity that can receive one or more assertions. The relying entity 161 can be any entity requesting information (e.g., assertions) about the target entity 111. For example, the relying entity 161 can be a merchant requesting information (e.g., assertions) about a target entity 111 initiating a payment transaction. Additionally or alternatively, the relying entity 161 can be an entity (e.g., a government agency or business organization) requesting information (e.g., assertions) about the target entity 111 with respect to a non-payment interaction (e.g., granting the target entity 111 access to a secured area or event venue).

In some embodiments, the relying entity 161 may be an entity with intent to deposit money directly into a payment account of the target entity 111. The relying entity 161 may seek to validate whether the account is associated with the target entity 111. The relying entity 161 may seek to validate whether the account is able to accept the deposit. The example system 100 can be used to provide a package of assertions that can be used by the relying entity 161 as confirmation whether the target entity 111 owns the account. The package of assertions may confirm additional information, such as whether the account accepts deposits.

In some non-limiting embodiments, the relying entity 161 may be assigned an identifier ("an identifier of the relying entity"). The identifier of the relying entity may include data associated with a digital signature and/or cryptographic key of the relying entity 161.

The relying entity 161 may be associated with one or more client computers, each of which may include a non-transitory computer readable medium coupled to a processor and one or more memories. These components may be substantially similar to, or different from, those described below with respect to FIG. 1B.

Figure 1B:
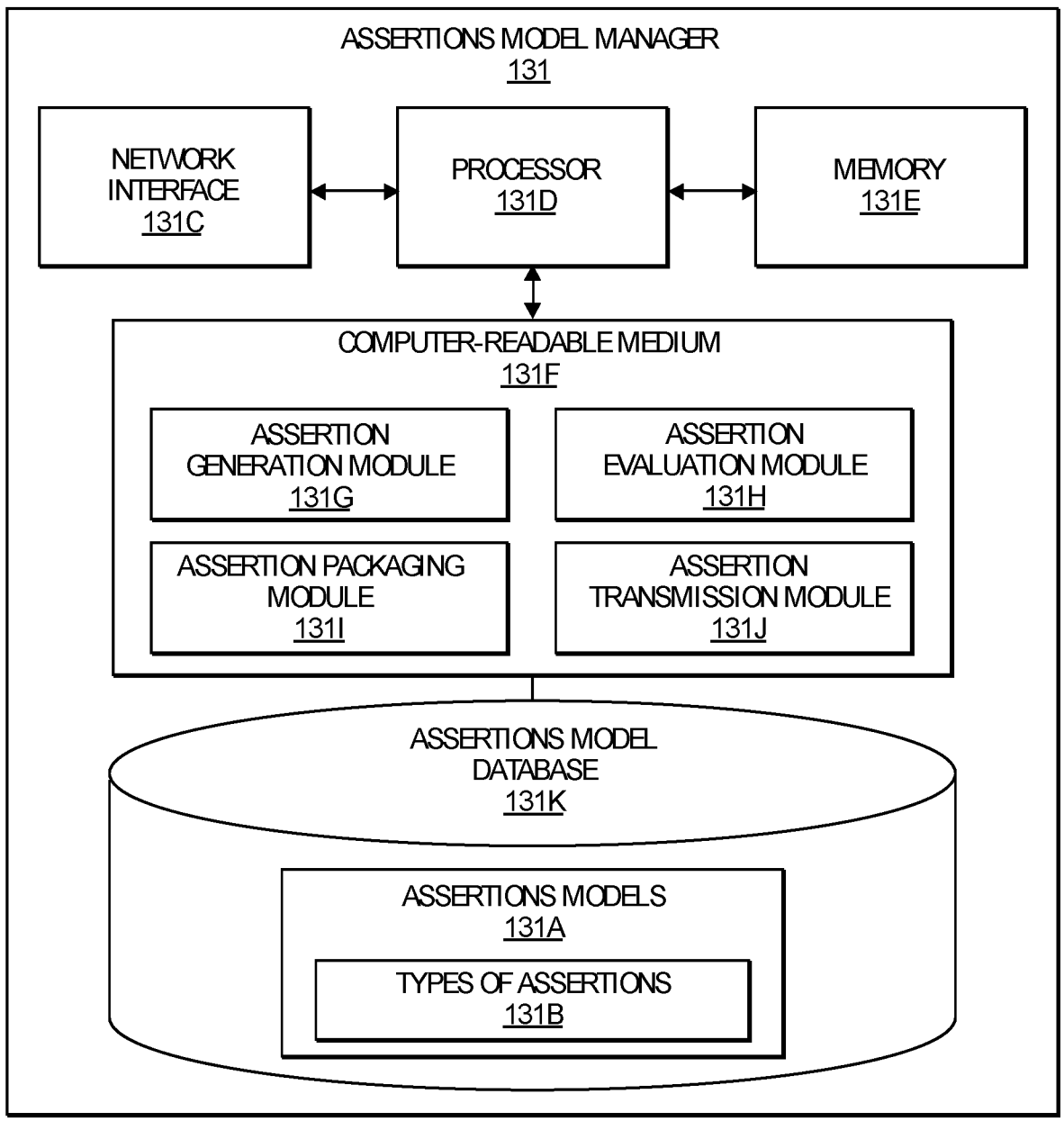
FIG. 1B is a schematic diagram of an assertions model manager according to a non-limiting embodiment.

Referring now to FIG. 1B, the assertions model manager 131 may include hardware and/or software configured to generate a package of assertions based on an assertions model 131A. The assertions model manager 131 may include a processor 131D operatively coupled to a network interface 131C, a memory 131E, and a computer-readable medium 131F. The assertions model manager 131 may further include an assertions model database 131K.

The assertions model database 131K may be a storage unit and/or device (e.g., a file system, database, collection of tables, or other storage mechanism) for storing data. The assertions model database 131K may include multiple different storage units and/or devices. The assertions model database 131K may store assertions models 131A and types of assertions 131B.

In some embodiments, a type of assertion 131B may be a category of assertions, e.g., whether an entity has had a relationship with a bank for one year or longer. A type of assertion 131B may correspond to an assertion value which is a true/false or yes/no statement. As an example, a type of assertion may correspond to whether a target entity is a United States citizen. The corresponding assertion value is "yes."

When an answer is provided corresponding to a type of assertion 131B and a particular target entity, e.g. "yes, Joe Smith is a United States citizen," this may be referred to as an "assertion" or "assertion value." The assertion value may be combined with supplemental data and/or formatted to generate an "assertion object."

Figure 2A:
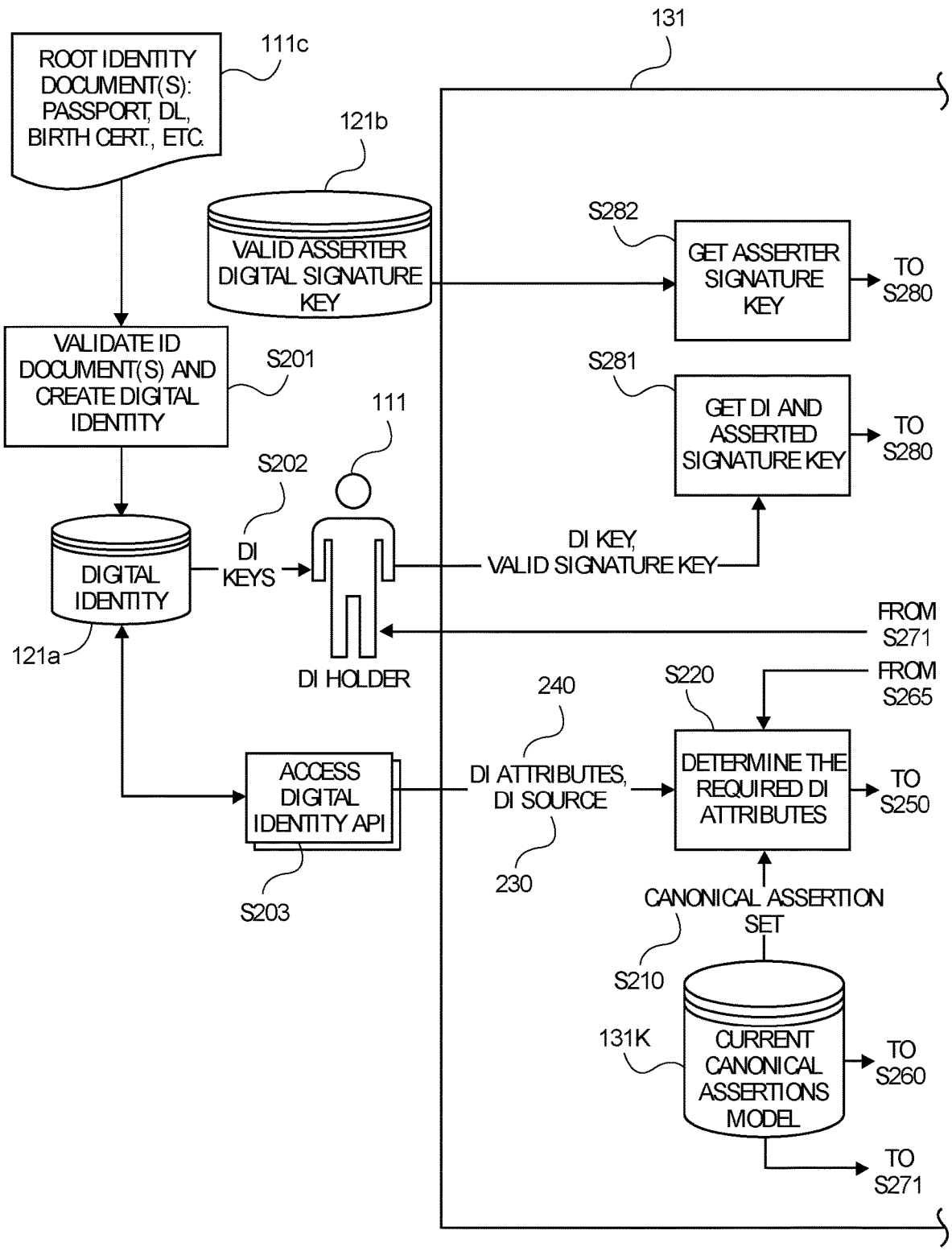
FIGS. 2A-2B show a schematic diagram of a system for providing at least one assertion based on a digital identity (DI) according to a non-limiting embodiment.

In some embodiments, a type of assertion 131B corresponds to a type of identity attribute (e.g. DI attributes 240, as shown in FIG. 2A). A type of identity attribute may be any category of data stored, e.g., by the DI provider 121. Examples of types of identity attributes include a name associated with a checking account, a date of birth, place of employment, etc. A type of assertion 131B may map to one or more types of identity attributes. As an example, the type of assertion "whether United States citizen" corresponds to the type of identity attribute "citizenship." For a given target entity, identity attribute data may, in turn, correspond to a given type of identity attribute. For example, the citizenship for Joe Taylor is "Canadian"). Based on an identified type of identity attribute, the assertions model manager may locate corresponding identity attribute data (e.g., from the DI provider 121 shown in FIG. 1A).

An assertions model 131A may specify one or more types of assertions. For example, a particular assertions model 131A may include three types assertions 131B—whether the target entity 111 is an employee of Widget Corp., whether the target entity 111 has a valid security clearance, and whether the target entity 111 is a United States Citizen.

In some embodiments, an assertions model 131A may include one or more types of identity attributes in addition to the types of assertions 131B. For example, a particular assertions model 131A may include: (1) whether the target entity is a resident of Texas (a type of assertion), (2) whether the target entity is at least 18 years of age (a type of assertion), (3) the target entity's name (a type of identity attribute), and (4) the target entity's address (a type of identity attribute). If the assertions model 131A is used to generate a package of assertions using actual identify attribute data, increased security measures may be implemented. For example, access to actual data may be restricted using a cryptographically secure link that goes out of scope after a certain amount of time or under certain conditions.

The assertions model 131A may specify additional information. The assertions model 131A may specify a name of the assertions model. The assertions model 131A may specify a context (e.g. social media or online banking). The assertions model 131A may specify an authentication method (e.g., an appropriate authentication method determined based on the type of relying entity, which may include credentials). The assertions model 131A may further specify a method of combining or rating the assertions, a name/identifier and current version number of the assertions model, and/or the date on which the assertions model was last updated.

An assertions model 131A may be tailored to one or more types of relying entities or domains (e.g., there may be an assertions model for ecommerce, an assertions model for government entities, an assertions model for bars, an assertions model for rental car companies, etc.). As an example, an assertions model for the type of relying entity "liquor store" may include two types of assertions 131B: (1) whether the target entity is 21 or older and (2) whether the target entity has access to at least $5 in a payment account. Alternatively, or additionally, an assertions model may be tailored to a specific relying entity (e.g. a particular store, the DMV, a particular restaurant, etc.). As an example, an assertions model 131A for Joe's Liquor may include two types of assertions 131B: (1) whether the target entity is 21 or older and (2) whether the target entity has at least $50 in a payment account. Additionally or alternatively, assertions models may vary according to the target entity 111 and/or DI provider 121.

In some embodiments, each assertions model 131A may map to a plurality of relying entities 161 and/or types of relying entities. The assertions model manager 131 may, for example, store such mappings to the assertions model database 131K.

In some embodiments, the assertions models 131A may be generated by the assertions model manager. For example, the assertions model manager may generate one or more assertions models corresponding to a relying entity that seeks to deposit funds into an account. The assertions model(s) may be generated, for example, based on historical data specifying information requested by such entities (e.g., the name of the account holder, whether the account can accept deposits, etc.). Alternatively, or additionally, the assertions model manager may obtain assertions models from, or in cooperation with, other entities in the system (e.g., the relying entity 161, the target entity 111, and/or the DI provider 121). As an example, the target entity, an individual, may submit information to an Application Programming Interface (API) exposed by the assertions model manager 131 specifying that the individual only wishes to allow liquor stores to obtain an assertion whether the individual is at least 21 years old.

The network interface 131C may be configured to connect to one or more communication networks to allow the assertions model manager 131 to communicate with other entities such as the DI provider 121, the relying entity 161, the target entity 111, etc. For example, communication with the assertions model manager 131 can be direct, indirect, and/or via an API.

The processor 131D may be implemented as one or more integrated circuits (e.g., one or more single core or multicore microprocessors and/or microcontrollers). The processor 131D may be used to control the operation of the assertions model manager 131. The processor 131D can execute a variety of programs in response to program code or computer-readable code stored in memory 131E. The processor 131D may include functionality to maintain multiple concurrently executing programs or processes.

The memory 131E may be implemented using any combination of any number of non-volatile memories (e.g., flash memory) and volatile memories (e.g., DRAM, SRAM), or any other non-transitory storage medium, or a combination of media.

The computer-readable medium 131F may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 131F may be any combination of such storage or transmission devices.

The computer-readable medium 131F may comprise software code stored as a series of instructions or commands The computer-readable medium 131F may comprise an assertion generation module 131G, an assertion evaluation module 131H, an assertion packaging module 131I, and an assertion transmission module 131J.

In some embodiments, the assertion generation module 131G includes software and/or hardware configured to generate assertions. The assertion generation module 131G may use an assertions model 131A, and/or information specified by the relying entity 161, to identify one or more types of identity attribute corresponding to a particular type of assertion. For example, the assertions model manager 131 generates an assertion whether the target entity 111 has had a banking relationship with a particular DI provider 121 for two years or more. The assertion generation module 131G may determine, e.g., using a look-up table or mapping, that the assertion corresponds to the identity attribute data "account status" and "date of opening first account." The assertion generation module 131G may retrieve the corresponding identity attribute data from the DI provider. The assertion generation module 131G may compute an assertion value, based on the retrieved identity attribute data.

The assertion evaluation module 131H includes software and/or hardware configured to evaluate assertions. The assertion evaluation module 131H may compute a strength score for an assertion. As an example, the assertion evaluation module 131H may compute a strength score for an assertion based on the latest update to the underlying identity attribute data, the reference source of the underlying attribute data (e.g., a driver's license, or a statement from an individual), and/or the DI provider 121 associated with the underlying attribute data. For example, a social media assertion is generated based on only a validated email address. Accordingly, the social media assertion is assigned a relatively "weak" score. A DI provider 121 may generate an assertion using identity attribute data confirmed using a state document like a driver's license, proof of address, background checks of the data against several different databases (e.g. credit history), and a bank clerk looking at the target entity to verify that the individual matches the presented driver's license picture. Accordingly, an assertion from a DI provider 121 which is a bank may produce a relatively "strong" score indicating confidence in the assertion, derived as a function of the root identity attribute data, the verifications performed, and/or confidence in the DI provider 121.

The assertion evaluation module 131H may identify filter criteria for evaluating one or more assertions. The filter criteria may comprise a minimum acceptable strength score for one or more assertions. For example, the assertions model manager 131 may receive, from a relying entity 161, a request for a package of assertions including the criterion "only use data with a strength score greater than 80%." Alternatively, or additionally, the assertion evaluation module 131H may itself determine appropriate filter criteria for evaluating one or more assertions. For example, the assertions model manager may maintain a table of minimum acceptable strength scores corresponding to various types of relying entities 161, DI providers 121, and/or target entities 111 (e.g., 95% confidence required for border crossings; 30% confidence required for establishing a social media account, etc.).

In some embodiments, the assertion packaging module 131I includes software and/or hardware configured to generate a package of assertions. A package of assertions may correspond to a plurality of assertions grouped together in a targeted fashion (e.g., for a particular relying entity 161 or type of relying entity). A package of assertions may further include supporting data such as a strength score for the package of assertions and/or strength scores for the underlying assertions comprising the package of assertions. The assertion packaging module 131I may generate a package of assertions by collecting the necessary underlying assertions and/or supporting data. The assertion packaging module 131I may convert the assertions and/or supporting data into an appropriate format. The assertion packaging module 131I may further encrypt and/or digitally sign the package of assertions and/or underlying assertions.

In some embodiments, a package of assertions may be formatted as a "clustered" assertion, where a plurality of underlying assertions are used to generate a single assertion computed based on the underlying assertions. In this case, the assertion packaging module 131I may further compute the clustered assertion based on the underlying assertions.

In some embodiments, the assertion transmission module 131J may transmit packages of assertions and/or information about the packages of assertions. The assertion transmission module 131J may include one or more application programming interfaces (APIs) for sending/receiving data.

In some embodiments, the assertion transmission module 131J may transmit the package of assertions directly to the relying entity 161 (e.g., by a message). Alternatively, or additionally, the assertion transmission module 131J may write assertion data corresponding to the package of assertions to the ledger of assertions 141 and/or event log 151.

In some embodiments, the computer-readable medium 131F comprises code, executable by the processor 131D, to implement a method comprising: receiving, by a server computer from a relying entity, a request for assertions, wherein the request for assertions includes an identifier of the relying entity and a hash of an identifier of an account; determining, by the server computer, an assertions model based on the identifier of the relying entity; retrieving, by the server computer, a package of assertions associated with the account based on the assertions model and the hash of the identifier of the account; and transmitting, by the server computer, the package of assertions to the relying entity.

Returning to FIG. 1A, in some non-limiting embodiments, the assertions model manager 131 can include and/or be in communication with a ledger of assertions 141 and/or an event log 151.

The ledger of assertions 141 may be a file, a collection of files, or a database for storing assertions data. The ledger of assertions 141 may be a distributed ledger. The ledger of assertions, may for example, be implemented as an Ethereum blockchain, which is supported by the Ethereum Foundation (https://www.ethereum.org/). As another example, a Hyperledger may be used, which is an open-source Linux Foundation project (https://www.hyperledger.org/). Alternatively, or additionally, the assertions may be stored to a central database (e.g., maintained by the assertions model manager 131).

The ledger of assertions 141 may include a voting mechanism. For example, participants of the ledger of assertions 141, a distributed ledger, may vote on an assertion, package of assertions, authorizing entity, and/or DI provider. The votes may be based on, e.g., whether an assertion was useful or valid. Assertions may be selected for future use or rejected based on a number of votes. The number of votes required may vary based on the strength score of an authorizing entity, DI provider or assertion (e.g., the higher the strength score, the fewer votes required).

The event log 151 may be a file, a collection of files, or a database for storing event data. Each event may correspond to a request for information. For example, an event may correspond to a relying entity request for user data in association with a transaction. Alternatively, or additionally, events may correspond to interactions with an account (e.g., deposits, withdrawals, etc.). The assertions model manager may obtain notification of such events from the DI provider 121, e.g., via API. For a particular event, the system may store event data such as the parties involved, a type of the event, a timestamp, etc. Each event may be encrypted using a set of cryptographic keys. An event may, for example, be encrypted using the cryptographic key of the target entity 111, the cryptographic key of the DI provider 121, and/or the cryptographic key of the relying entity 161. The event may further be encrypted with cryptographic keys assigned to other entities, such as one or more third party facilitators or technology providers (e.g., financial transaction processors).

The event log 151 may be used to access event metadata for tasks such as dispute resolution, fraud detection, and/or analysis of user behaviors. By restricting access to the cryptographic keys needed to access one or more events, the event structure helps to keep data associated with a target entity private. For example, a private key held by a target entity may be required to access event data, ensuring that event data is only available with explicit permission from the target entity. Access paths to the event data may be defined via a common API structure. The access paths may be established such that limited entities may access the events with limited amounts of data.

The ledger of assertions 141 and the event log 151 each can be stored in any suitable computer-readable storage medium and/or any suitable combination of computer-readable storage media. For example, the ledger of assertions 141 and/or the event log 151 can be stored in a database. Additionally or alternatively, the ledger of assertions 141 and/or the event log 151 can be maintained and stored in a distributed ledger, including but not limited to a blockchain and/or the like. For purpose of illustration and not limitation, with reference to FIG. 1A, the ledger of assertions 141 is depicted as a distributed ledger and the event log 151 is depicted as a database.

The system 100 may further include a key locker 171. The key locker may be a be a file, a collection of files, or a database for storing cryptographic keys. The key locker 171 may be cloud-based. The key locker 171 may store cryptographic keys assigned to various entities (e.g., a cryptographic key assigned to a target entity 111, a DI provider 121, a relying entity 161, etc.). The key locker 171 may organize the keys based on target entity 111, such that the keys of parties that have been involved in events in association with a target entity 111 are stored in a structure based on that target entity 111. This set of keys may be encrypted using a key of the target entity 111, such that a private key held by the target entity 111 is required to release the set of keys. Alternatively, or additionally, a pairwise key set may be assigned for each relationship. As an example, a pairwise key set may be assigned for the target entity 111 and the relying entity 161.

In some embodiments, one or more of the keys may encoded based on the Base58 model. Base58 is a type of binary-to-text encoding using fifty-eight easily distinguished alphanumeric symbols and a payload of arbitrary size. Additionally, one or more keys may be encoded in Wallet Import Format (WIF). WIF is a method of encoding a key which facilitates copying the key and allows for compression. Some keys may or may not be encoded and/or encrypted based on the appropriate security level.

Methods

Methods are described for providing a package of assertions. A package of assertions may correspond to a plurality of assertion values. In particular, the assertions may be related to verifying an account (e.g., a payment account) associated with a target entity. The assertions may be related to authenticating a status or configuration associated with that account (e.g., deposit authentication). Deposit authentication may be associated whether a particular account is capable of receiving deposits (e.g., receiving a transfer of funds from another account).

Providing Assertions Based on a DI

Figure 2B:
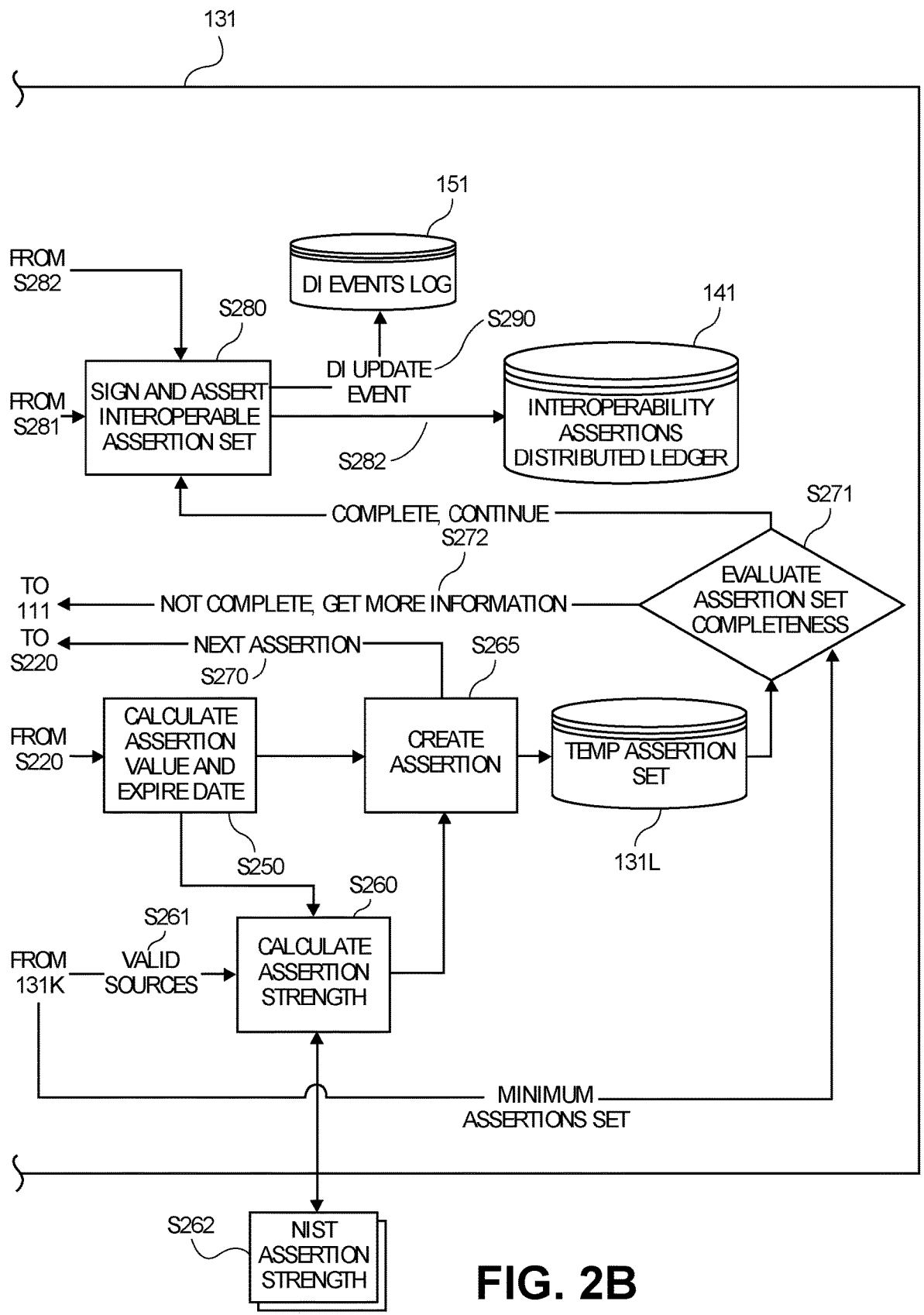

Referring now to FIGS. 2A-2B, a schematic sequence diagram of a system for providing assertions based on a DI is shown according to a non-limiting embodiment. To initiate creating a DI, the target entity 111 provides at least one reference of identity attribute data 111C to the DI provider 121 (shown in FIG. 1A). For example, as shown in FIG. 2A, the references 111C may include root identity documents such as a passport, a driver's license (DL), a birth certificate, etc.

At step S201, the DI provider 121 validates the reference(s) of identity attribute data 111C. As an example, the target entity may show a driver's license to the DI provider, a bank. The bank may swipe the driver's license to ensure the validity of the driver's license before accepting it as a valid source of information (e.g., date of birth, name, address, etc.).

If the reference(s) are valid, then the DI provider creates a DI for the target entity 111 to be stored in its DI database 121A. Additionally or alternatively, at step S202, the DI provider may provide a cryptographic key to the target entity 111 corresponding to the DI associated with the target entity 111.

At step S203, the DI provider 121 and/or the target entity 111 may communicate with the assertions model manager 131 via an API exposed by the assertions model manager 131. Via the API, the DI provider may transmit identity attribute data and/or assertions. As shown in FIG. 2A, the DI provider 121 transmits identity attribute data 240 (e.g., a target entity's date of birth or social security number) and information about the reference source of the identity attribute data 230 (e.g., a driver's license, a government entity, etc.) to the assertions model manager 131 via the API.

At step S210, the assertions model manager 131 may receive or retrieve an assertions model 131A (e.g., from the assertions model database 131K). Based on the assertions model, the assertions model manager 131 determines the required types of identity attributes specified by the assertions model. The assertions model manager 131 may determine one or more types of identity attributes corresponding to the type of assertion (e.g., date of birth is a type of identity attribute corresponding to the assertion AGE≥21). The assertions model manager 131 may further determine a reference source of identity attribute data corresponding to each respective type of identity attribute (e.g., a driver's license validated by a bank is the reference source of the target entity's date of birth).

At step S220, the assertions model manager 131 may obtain identity attribute data associated with the target entity corresponding to the type of identity attribute identified. For example, the assertions model manager 131 may retrieve the target entity's date of birth from the DI provider via the API.

At step S250, the assertions model manager 131 may calculate a value of an assertion corresponding to the type of assertion based on the identity attribute data associated with the entity. Calculating a value of an assertion based on obtained identity attribute data is described in detail below with respect to FIG. 4.

At step S261, the assertions model manager 131 may identify a list of valid sources (e.g., from the assertions model database 131K). At step S262, the assertions model manager may further identify a technique to calculate a strength score of each assertion.

At step S260, the assertions model manager 131 may calculate a strength score for each assertion, as described below with respect to FIG. 4.

At step S265, the assertions model manager 131 may create an assertion, as described in detail below with respect to FIG. 4. The assertion may be temporarily stored in a temporary assertion set 131L.

At step S270, the assertions model manager 131 may determine whether there are remaining types of assertions in the assertions model. For example, if there are remaining types of assertions, the process for each type of assertion can be repeated starting at S220.

Additionally or alternatively, at step S271, the assertions model manager 131 may determine that the DI provider 121 does not have the identity attribute data necessary to create a particular assertion included in the assertions model. In this case, the assertions model manager and/or the DI provider may transmit a request to the target entity 111 to provide additional information required to complete creating the assertions.

At step S280, the assertions model manager 131 may sign and assert the package of assertions. For example, signing the package of assertions can include, at S281, obtaining the cryptographic key of the target entity 111 and/or obtaining the cryptographic key of the DI provider 121. At step S280, the assertions model manager 131 may use the cryptographic key(s) to sign and assert the package of assertions.

At step S282, the assertions model manager 131 may transmit the package of assertions. The assertions model manager may, for example to write the package of assertions to the ledger of assertions 141.

Additionally or alternatively, at step S290, the assertions model manager 131 may update the event log 151. Writing to the ledger of assertions and updating the event log are described in detail below with respect to FIG. 4.

Providing Assertions Including Deposit Authentication

Figure 3:
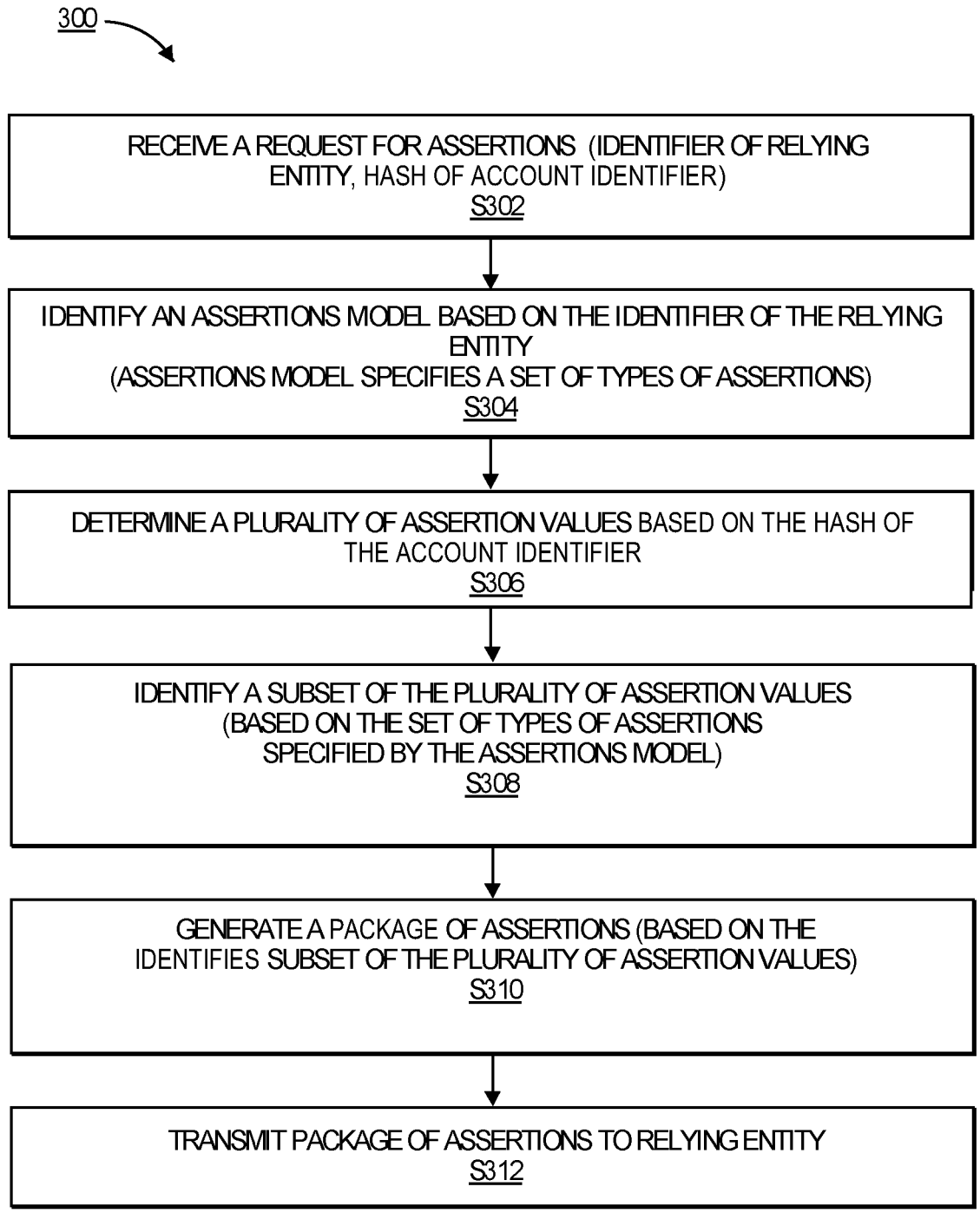
FIG. 3 is flow diagram for a method of providing a package of assertions including deposit authentication, according to a non-limiting embodiment.

Referring now to FIG. 3, a flow diagram of a method 300 for providing a package of assertions is shown according to a non-limiting embodiment. FIG. 3 is best understood in the context of the example system 100 shown in FIGS. 1A-1B.

Initially, a relying entity may request from a target entity (e.g., a payee) an identification of an account (e.g., a payment account) for receiving a deposit. The account may be associated with a particular DI provider which is an authorizing entity for the account. The target entity may then provide the relying entity with an account identifier. For example, the payee may provide a unique moniker (e.g., a unique string or sequence of characters, which can be in the form of a human-recognizable string such as a nickname) that the target entity has previously configured and associated with the account. Such a moniker may be selected by the target entity, e.g., based on an ability to remember the moniker. As examples, the moniker may be "Eric's checking account" or "Piggy bank number one." The moniker may be uniquely associated with the payment account of the target entity provided by the DI provider. Alternatively, or additionally, the account identifier may be a primary account number (e.g., a bank account number associated with an account provided by the DI provider).

The relying entity may, immediately or at a later time, submit a request for assertions about the account to the assertions model manager. The request may include the account identifier, an identifier of the relying entity, and/or an identifier of the target entity. In some embodiments, the relying entity may first hash any information prior to submitting it to the assertions model manager. For example, the relying entity may hash the account moniker and send that hash to the assertions model manager in the request for assertions.

At step S302, the assertions model manager may receive, from a relying entity, a request for one or more assertions. The request may include an identifier of the relying entity. The request may also include an account identifier, which may be hashed. The account identifier may correspond to an account of the target entity. The account identifier may be an account moniker or nickname previously configured by the target entity. The account moniker may map to a primary account number associated with the account and/or a token based on the account number. Alternatively, or additionally, the account identifier may be the primary account number or a token corresponding to the primary account number. The request may further include an identifier of the target entity. Some or all of this information may be received in hashed form to prevent the transmission of personally identifying information. The assertions model manager may receive the request from the relying entity via an API push and/or a received message.

The request may further include additional data. The request may include entity type data identifying a type of entity associated with the relying entity. For example, the entity type data may comprise a merchant category code (MCC) and/or the like. The request may include assertions request data associated with at least a subset of the type(s) of assertion(s) in an assertions model.

The assertions model manager may communicate a package of assertions that the relying entity is permitted to request. For example, the relying entity may be entitled to a subset of potential assertions based on its entity type. Such a communication to determine the package of assertions the relying entity is permitted to request can also be logged in the event log (e.g., the assertions model manager may update the event log).

As an example, for the purpose of illustration and not limitation, the relying entity may manage short-term rentals. Based on the entity type, the relying entity may be permitted to request information specifying whether the account is associated with the target entity, whether the account can accept deposits, and whether the target entity has had a relationship with the issuer of the account for a threshold time period (e.g., at least two years). As another example, the relying entity may be permitted to request information specifying whether the target entity has a current active account relationship with the DI provider/authorizing entity. As another example, if the relying entity is a bar, then the relying entity may be permitted to request assertions specifying whether the target entity is old enough to purchase alcohol and has a valid payment account.

The assertions model manager may refrain from generating the package of assertions if the relying entity requests assertions which the relying entity is not permitted to receive. For example, if the relying entity is a bar, the relying entity may not be permitted to receive assertions indicating whether an account accepts deposits. The assertions model manager may refrain from performing operations S304-S312 upon determining that the relying entity has requested unpermitted assertions.

At step S304, the assertions model manager may identify an assertions model based on the identifier of the relying entity. The assertions model manager may, for example, use a stored mapping to identify an assertions model which maps to the relying entity based on the cryptographic key assigned to the relying entity.

In some embodiments, the assertions model specifies a set of assertion types. As an example, the assertions model identified by the assertions model manager specifies three types of assertions: whether the account is configured to accept deposits, whether the target entity owns the account, and whether the target entity owns a house that is being offered for a nightly rental. The assertions model manager may determine the relevant assertions for the account that the relying entity is entitled to receive based on the located assertion model.

At step S306, the assertions model manager may determine a plurality of assertion values for the target entity. For each type of assertion in the assertions model, the assertions model manager may compute a corresponding assertion value, as described in detail below with respect to FIG. 4.

Alternatively, or additionally, the assertions model manager may retrieve a plurality of stored assertion values. As an example, after computing an assertions value, the assertions model manager may store the assertions value to the ledger of assertions. The assertions model manager may then retrieve the plurality of assertion values from the ledger of assertions. In some embodiments, the assertions model manager may identify assertions generated by another entity. For example, the assertions model manager may retrieve, from, a DI provider, an assertion generated by the DI provider.

At step S308, the assertions model manager may identify a subset of the plurality of assertion values for the target entity. The assertions model manager may identify the subset of the plurality of assertion values for the target entity based on the set of types of assertions specified by the assertions model.

The assertions model manager may locate assertions for the account based on the information in the request. For instance, the request may include a hash of the account moniker. The assertions model manager may compare the hashed moniker to hashed monikers stored to the ledger of assertions. A matching comparison would indicate that the account is recognized and can be used to retrieve additional information associated with that particular account. If a match is found, then the assertions model manager may retrieve one or more assertions. If no match is found, the assertions model manager may refrain from verifying the account.

In some embodiments, the assertions model manager may already have on-file a number of assertions received from the DI provider (e.g., an authorizing issuer of the account) that are associated with that account. For instance, the assertions model manager may have information regarding whether: a) the financial entity knows the target entity based on the identification provided; b) the target entity has a valid payment account with that financial entity; and c) that particular payment account will accept a deposit from the relying entity.

In some embodiments, if the plurality of assertion values have previously been determined, then the assertions model manager may filter the plurality of assertion values based on the types of assertion values specified by the assertions model. As an example, the assertions model manager identifies, in the ledger of assertions, one-hundred assertion values previously determined for target entity John Doe. The identified assertions model includes five of the one-hundred types of assertions corresponding to the one-hundred assertion values. Accordingly, the assertions model manager selects the five assertions values, corresponding to the five types of assertions specified by the assertions model.

Alternatively, or additionally, the assertions model manager may identify the subset of the plurality of assertion values for the target entity by determining one or more of the assertion values in real-time, as described below with respect to FIG. 4.

At step S310, the assertions model manager may generate a package of assertions. The assertions model manager may generate the package of assertions based on the subset of the plurality of assertion values identified at step S308. A package of assertions may include two or more distinct assertion values for the target entity. For example, the assertions model manager may combine seven identified assertions into a data packet.

The data packet may include additional data related to the assertions model and/or underlying assertions. The data package may include information about the package of assertions (e.g., package name, ID, expiration date, creation date, etc.). The data packet may include data related to the assertions model used (e.g., an assertion model name, ID, date, descriptor, etc.). The data packet may include data related to underlying assertions used to generate the package of assertions (e.g., an assertion name, ID, type, expiration date, etc.). The data packet may include data related to a score assigned to the assertions model and/or an underlying assertion (e.g., the score, the date the score was generated, etc.).

Alternatively, or additionally, the package of assertions may be or include a clustered assertion (i.e., a single yes/no answer generated based on multiple underlying assertions). The assertions model manager may determine the clustered assertion using available underlying assertions. The method of generating the clustered assertion based on underlying assertions may be defined in the assertions model or held in an API definition. For instance, one method of generating the clustered assertion is to check to see if all underlying assertions are all YES, which would make the clustered assertion also a YES, but if any of the underlying assertions is a NO, then the clustered assertion becomes a NO. As another example, the assertions model manager may generate a clustered assertion which requires two or more of a set of three underlying assertions to be affirmative, in order for the clustered assertion to be affirmative.

In some embodiments, the information may or may not also include a value for the underlying assertion (assertion value). In the case of a clustered assertion, the assertion values for the underlying assertion may be omitted from the data package. Alternatively, the underlying assertion values may be included in the data package but may not be accessible to the relying entity. For instance, the data package may be encrypted and the relying entity may not be able to access the data package in order to scrutinize the underlying assertion values used to generate the clustered assertion. Instead, the relying entity may store the received data package for evidence in order to resolve any later disputes. For instance, if the relying entity is at fault due to a received clustered assertion (e.g., by depositing money into the wrong person's account), the relying entity may be able to furnish the data package associated with that clustered assertion to absolve themselves of fault and to determine how the mistake was made (e.g., determine that the value of a particular underlying assertion was incorrect). Alternatively, only the values for each underlying assertion may be encrypted to achieve the same effect.

At step S312, the assertions model manager may transmit the package of assertions to the relying entity. The assertions model manager may transmit the package of assertions via an API exposed to the relying entity and/or as a message to the relying entity. Alternatively, or additionally, the assertions model manager may transmit the package of assertions to the relying entity using a ledger of assertions and/or event log, as described in detail below with respect to FIG. 4.

In one specific example, the relying entity may be an entity seeking to provide a refund to an individual. For instance, the relying entity may be an agency of the federal government (e.g., the IRS) looking to deposit tax returns to individual accounts. To reduce the risk of depositing a tax return into the wrong account, the relying entity may seek account verification and deposit authentication by retrieving a package of assertions from the assertions model manager.

In another specific example, which will now be described in further detail, the relying entity may be a company engaged in operating an online marketplace and hospitality service for people to lease or rent short-term lodging, including holiday cottages, apartments, homestays, hostel beds, or hotel rooms (e.g., as a broker that receives fees in conjunction with every booking in exchange for brokering the rental). One common scenario that may arise may involve the relying entity brokering the temporary rental of an individual's domicile.

For instance, an individual (e.g., a target entity) may be going on vacation for a month, during which the individual's apartment will be empty. Rather than leave a vacant apartment sitting idle, the individual may wish to rent out the apartment to someone else for the duration. Thus, the target entity may sign up for an interaction to rent out the apartment through the relying entity. The target entity may provide information pertinent to the interaction (e.g., payment information for a payment account to receive rental fees, apartment information and photos, and so forth). After the target entity chooses to rent out the apartment, the relying entity may allow a vacationer to browse a list of short-term housing for rent based on a set of specified criteria. In the case that the vacationer wants to rent out the apartment of the target entity, then in some embodiments, the relying entity may broker a direct transaction between the vacationer and the target entity. This may result in an attempt to transfer funds to a payment account of the target entity.

However, the payment information provided by the target entity may not be correct (e.g., the payment information is not actually associated with the target entity's payment account). This places a risk on the relying entity when attempting to transfer money into a target entity's account for the first time (e.g., if it is the target entity's first rental). For instance, the payment information may mistakenly be for another person's payment account, in which case, this other person will receive the rental fee instead of the target entity.

Accordingly, the relying entity may seek to obtain a verification of an individual's payment account (e.g., the payment account of the target entity). The relying entity may further seek additional information associated with that account, such as whether that account accepts deposits (e.g., the account will accept a deposit of the rental fee from the relying entity). The relying entity may obtain this information by contacting the assertions model manager and providing some identification of the relying entity, identification of the individual, and identification of the individual's payment account (e.g., the financial entity associated with the account, the account number, a unique moniker associated with the account, and/or some other unique identification of that account). Some or all of this information may be provided in hashed form rather than passing the underlying raw data (e.g., an account number in plain text). This is advantageous for added security and General Data Protection Regulation (GDPR) compliance.

In return, the assertions model manager may use this information (e.g., identification of the individual and identification of the individual's payment account) to obtain the answers sought by the relying entity. The assertions model manager may have previously generated assertions based on underlying information retrieved from the DI provider (e.g., authorizing entity/bank) regarding account verification and deposit authentication for that account. The assertions model manager may retrieve those assertions based on the identification of the target entity and/or account. Alternatively, or additionally, the assertions model manager may contact the DI provider associated with the account and provide the identification of the individual and/or account, in order to have the DI provider return assertions associated with account verification (e.g., the account number is indeed associated with that individual) and deposit authentication (e.g., the account accepts deposits).

In either case, the assertions model manager may collect only the assertions that are relevant to that particular relying entity. The specific set of relevant assertions may be defined in advance in an assertions model that can be based on the particular relying entity or type of relying entity (e.g., all entities associated with providing short-term housing rental). The package of assertions can then be sent by the assertions model manager to the relying entity. Since these assertions are essentially a set of true/false or yes/no statements, they contain no personally identifiable information. Thus, the assertions model manager may provide requested information back to the relying entity without endangering the privacy rights of the target entity. Once the relying entity receives confirmation of account verification and deposit authentication, the relying entity can safely deposit the rental fee into the account of the target entity knowing that the likelihood of fraud has been reduced by 95%.

Determining Assertion Values

Figure 4:
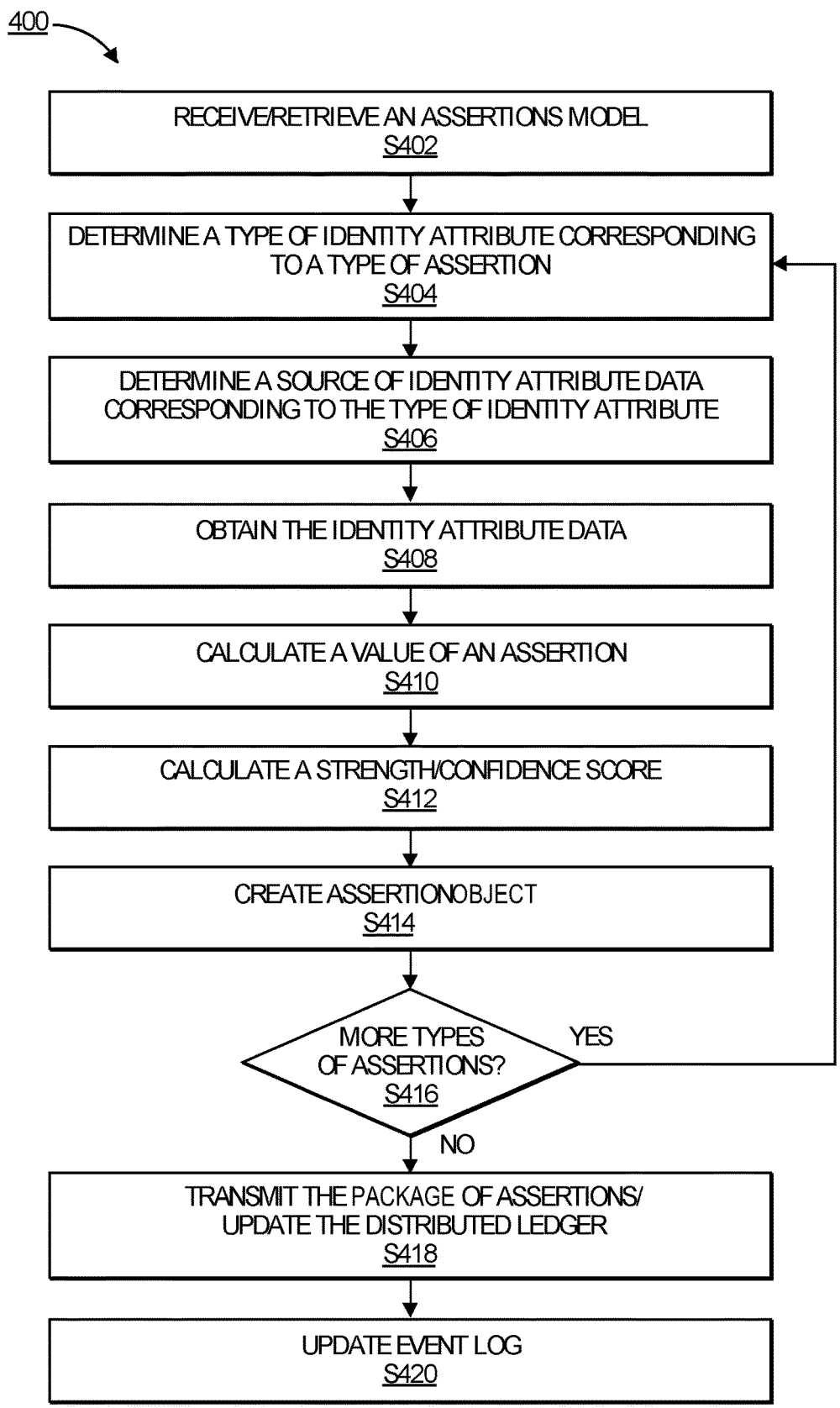
FIG. 4 is flow diagram for a method of determining assertion values for inclusion in a package of assertions, according to a non-limiting embodiment.

Referring now to FIG. 4, a flow diagram of a method 400 for determining assertion values for inclusion in a package of assertions is shown according to a non-limiting embodiment. FIG. 4 is best understood in the context of the example system 100 shown in FIGS. 1A-1B.

At step S402, the assertions model manager may receive or retrieve an assertions model. For example, the assertions model manager may retrieve data associated with the assertions model from the assertions model database. Additionally or alternatively, the assertions model manager may retrieve the data associated with the assertions model over a network from an external data storage, including but not limited to a database, a distributed ledger, a blockchain, and/or the like.

After step S402, the assertions model manager may identify a set of types of assertions corresponding to the assertions model. For example, the assertions model manager may determine that the assertions model includes three types of assertions: whether the target entity is at least 18 years of age, whether the target entity has a valid driver's license, and whether the target entity has a valid payment instrument. The assertions model manager may identify the types of assertions by analyzing the assertions model.

At step S404, the assertions model manager may determine a type of identity attribute corresponding to a type of assertion. The assertions model manager may use the assertions model to determine a type of identity attribute corresponding to each type of assertion of the assertions model. Each type of assertion of the assertions model may map to one or more respective types of identity attributes. For example, one type of assertion in the assertions model is whether the target entity is old enough to rent an automobile in the country in which the relying entity is located. This type of assertion maps to two types of identity attributes available from the DI providers: a date of birth of the target entity, and the country in which the relying entity is located.

At step S406, the assertions model manager determines one or more sources of identity attribute data corresponding to the type of identity attribute (e.g., DI providers and/or references from which the identify attribute data may be obtained). For example, the assertions model may include a list of valid sources of information for the types of assertions contained therein. As another example, a list of valid sources associated with one or more assertions models can be maintained and stored by the assertions model manager.

As a non-limiting example, the type of assertion is whether a target entity is old enough to rent an automobile. The type of identity attribute of interest is the date of birth of the target entity. A list of valid sources of date of birth information can include government documents (e.g., a driver's license, birth certificate, passport, and/or the like), a government database, business organization records (e.g., of an issuer, a transaction service provider, and/or the like), and/or the like.

Additionally or alternatively, the assertions model manager may identify a verification method for verifying the type of identity attribute. As examples, the verification method may include inspection of documentation by the DI provider, verification by a business organization (e.g., a third-party service), and/or verification by a government agency. The assertions model manager may, for example, identify verifications stored in association with the respective types of identity attributes.

At step S408, the assertions model manager may obtain the identity attribute data. The assertions model manager may communicate with a DI provider to obtain the identity attribute data associated with the target entity corresponding to the type of identity attribute in the assertions model. The assertions model manager may receive the identity attribute data, for example, via an API exposed to the DI provider. The assertions model manager may further retrieve, from one or more DI providers, information about the reference from which the data was obtained. Alternatively, or additionally, data may be obtained from a reference (i.e., without a DI provider). The assertions model manager may, for example, access a government database storing data regarding the ownership of plots of land).

As a non-limiting example, the assertions model manager is generating an assertion specifying whether a target entity is old enough to rent an automobile. The type of identity attribute of interest is the date of birth of the target entity. The identity attribute data associated with the date of birth may be a numerical representation of the date of birth of the target entity, a bit or bit string indicating whether the entity is above a certain age threshold (e.g., the minimum age to rent an automobile) or in a certain age category (e.g., under 18, between 18 and 25, over 25), and/or the like. Additionally, the identity attribute data may include the source of the date of birth data (e.g., visual inspection of a driver's license by the DI provider).

At step S410, the assertions model manager may calculate a value of the assertion. The assertions model manager may, for example, use an equation or algorithm stored in association with the assertions model to compute a value of the assertion based on the identity attribute data.

Continuing with the above example, the type of assertion is whether a target entity is old enough to rent an automobile. The type of identity attribute of interest is the date of birth of the target entity. An assertion value specifying whether the target entity is old enough to rent an automobile can be calculated based on the date of birth information provided by the DI provider using the following algorithm:

{"OfAgeToRentAutoInUSA"::="Yes" iff "Current date"−
   "Verified date of birth" 25 years else "No"} where "OfAgeToRentAutoInUSA" is the assertion value specifying whether the target entity is old enough to rent an automobile in the USA, "Yes" is the value if the target entity is old enough, "No" is the value if the target entity 111 is not old enough, "Current date" is the date on which the calculation is made, and "Verified date of birth" is the date of birth of the target entity 111 as provided by the DI provider 121 after verification of the source of that data.

Alternatively, or additionally, the assertions model manager may obtain and store an assertion generated by a DI provider. For example, the assertions model manager may obtain and store, to the ledger of assertions, assertions associated with an account. A package of assertions for deposit authentication may be generated and stored at some initial time. The target entity and/or DI provider may provide a primary account number associated with the account to the assertions model manager. The assertions model manager may generate and store a token.

The token may be a substitute value for the primary account number. The token may be stored by the assertions model manager in lieu of the account number for increased security and privacy (i.e., the assertions model manager may refrain from storing the primary account number). The assertions model manager may transmit the token to the DI provider for use in further communication in lieu of the primary account number. The assertions model manager may further obtain, from the DI provider and/or target entity, a moniker representing the account. The assertions model manager may request assertions and/or underlying data from the DI provider. For example, the assertions model manager may request a yes/no response whether the account associated with the token can accept deposits. The assertions model manager may store the assertion in association with the saved token.

At step S412, the assertions model manager may calculate a strength score associated with the value of the assertion. The strength score of the assertion may directly map to a strength score of the DI provider from which the assertion or underlying identity attribute data was obtained. Alternatively, or additionally, the strength score may be based on additional criteria. For example, an assertion related to income may require more supporting data, to receive a comparable strength score, as compared to an assertion related to height.

As a nonlimiting example, the strength score may be calculated based on the DI provider's verification process as follows:

$$\text{Strength Score (DI Provider)} = S_{ref} + S_{ver} + S_{link}/2$$

$S_{ref}$ is a strength score of the references used (e.g., a driver's license, utility bill, passport, etc. may each be given a score). $S_{ver}$ is a score based on how the DI provider validates the references (e.g., the score may increase if a DI provider confirms a first reference using a second reference). $S_{link}$ is a score based on how the DI provider links the reference to the entity (e.g., the link score may be incremented if the DI provider visually inspects an individual to confirm she is the individual pictured in a photo ID). The result, a strength score of the DI provider, may be attached to every assertion made by the DI provider. As another nonlimiting example, the strength score may be calculated based on a model such as a NIST model. The NIST model is described in NIST Special Publication 800-63A, Digital Identity Guidelines: Enrollment and Identity Proofing Requirements, U.S. Department of Commerce (updated Nov. 15, 2017), available at https://doi.org/10.6028/NIST.SP.800-63a, which is hereby incorporated herein in its entirety.

At step S414, the assertions model manager may create an assertion object. Each assertion object can include the value of the assertion and/or additional data. For example, an assertion object may include a name of the assertion, a strength score of the assertion, an expiration date of the assertion, etc.

Creating the assertion object may comprise calculating and including an expiration date of the assertion. For example, the assertion may expire after a particular amount of time elapses (e.g., the assertion should be recomputed biannually), when the source of the information expires (e.g. a driver's license). If the assertion will not expire, then the expiration date can be omitted or the expiration data can have a value of null, "none," 0, and/or the like.

In some embodiments, the assertions model manager may store the generated assertion object to a temporary package of assertions. Assertions and/or assertion objects may be temporarily stored to a temporary package of assertions until the full package of assertions corresponding to the assertions model is completed.

At step S416, the assertions model manager may determine whether there are remaining types of assertions in the assertions model for which an assertion has not yet been created. If there is at least one remaining type of assertion in the assertions model for which an assertion has not yet been created, then the next type of assertion can be selected and the process can be repeated (i.e., repeat steps S404-S416 until assertions corresponding to each type of assertion in the assertions model have been created).

After repeating steps S404-S416 one or more times, the assertions model manager may combine the assertions and/or assertion objects into a package of assertions. The assertions model manager may combine the assertions and/or assertion objects into a data packet. The assertions model manager may generate additional data and add the additional data to the data packet to form the package of assertions (e.g., assertion model name, assertion score, etc., as described above with respect to FIG. 3).

At step S418, the assertions model manager may transmit the package of assertions. The package of assertions may include a value of each assertion, corresponding to each type of assertion of the assertions model, and/or additional data about the assertion(s). The assertions model manager may transmit the package of assertions to the relying entity (e.g., via a message and/or API push). The assertions model manager may encrypt and/or digitally sign the package of assertions prior to transmission.

Additionally or alternatively, the assertions model manager may transmit the assertions by updating the ledger of assertions. The assertions model manager may write the assertions data associated with the package of assertions to the ledger of assertions. The assertions model manager may cluster the assertions data under an index of data corresponding to the target entity. The index may be encrypted using a public key assigned to the target entity. A private key assigned to the target entity may be required to access any assertions data associated with the target entity.

In some embodiments, the assertions model manager may store the package of assertions to be retrieved and transmitted at a later time. For example, the package of assertions for a particular payment account may be linked to one or more of a token corresponding to the account and/or a hashed moniker of that account. The assertions model manager may store the package of assertions in association with identifying information. The information may include the hashed account identifier, as well as information associated with that account (e.g., the identifier of the authorizing entity, the identifier of the target entity, the capability to accept deposits, and so forth). A particular target entity may be associated with multiple tokens. Thus, the assertions model database may store multiple sets of assertions (e.g., for payment account) indexed to a particular target entity. All of this data may have been obtained from the authorizing entity shortly after the individual has initially has set up their account and the account moniker. The data may be periodically refreshed or updated. For example, the assertions may be validated/ updated with each request for assertions. As another example, the assertions may be validated/updated every five days.

At step S420, the assertions model manager may update the event log. The assertions model manager may generate an event, associated with the transmission of the package of assertions in the event log. The assertions model manager may store additional data associated with the event in the event log such as event type, event value, etc. The assertions model manager may encrypt each event using multiple public keys assigned to multiple entities. For example, the event may be associated with the target entity, the requesting entity, two DI providers, and two processors. Each of these entities may be assigned a public key, which is used to encrypt the event.

Providing a Package of Assertions

Figure 5:
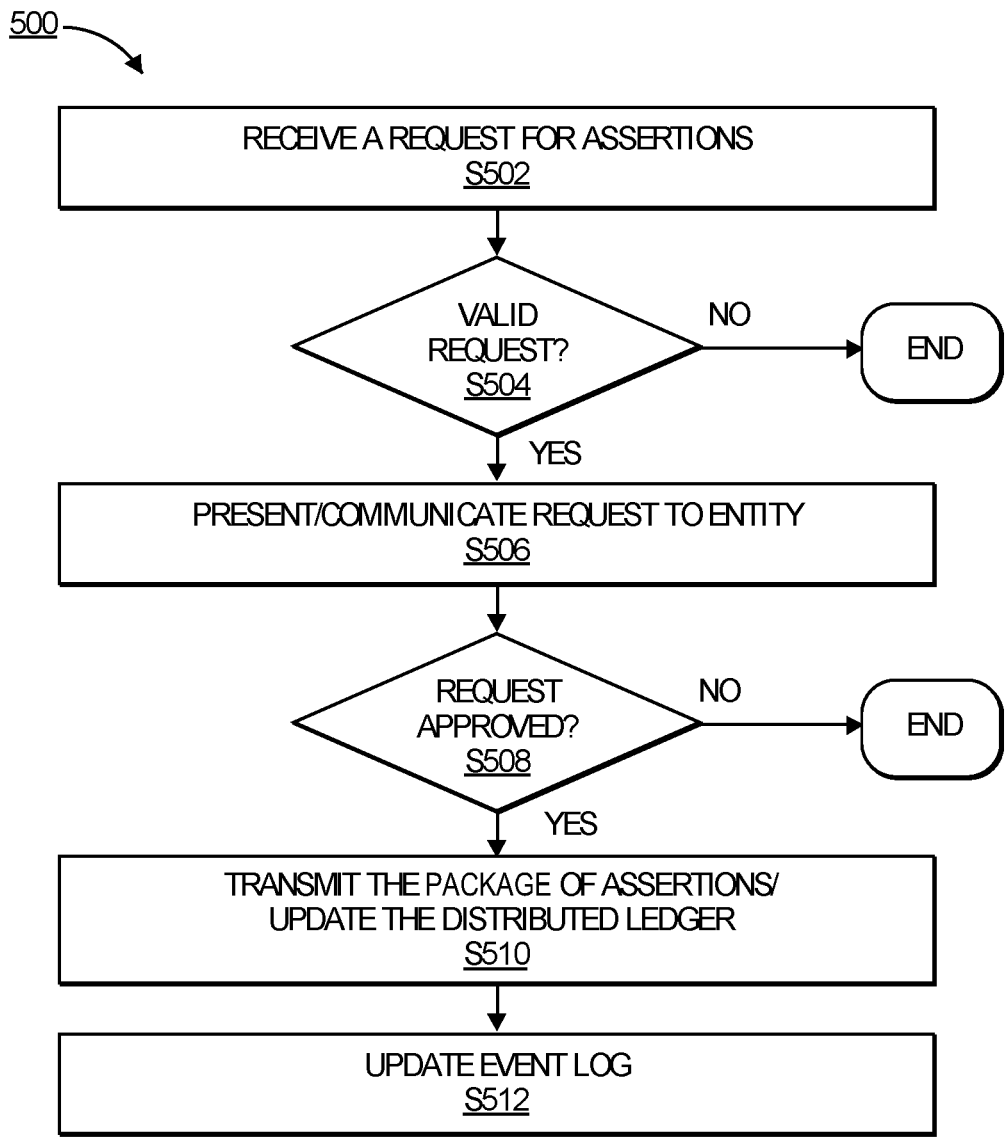
FIG. 5 is flow diagram for a method of providing a package of assertions, according to a non-limiting embodiment.

Referring now to FIG. 5, a flow diagram of a method 500 for providing a package of assertions is shown according to a non-limiting embodiment. FIG. 5 is best understood in the context of the example system 100 shown in FIGS. 1A-1B.

At S502, a request for assertions can be received. Receiving the request for assertions may be substantially similar to step S302, described above with respect to FIG. 3.

At step S504, the assertions model manager may determine whether the request for assertions is valid. For example, a relying entity of type "Bar" may request a package of assertions specifying whether a target entity has a mortgage. The assertions model manager may use the identifier of the relying entity to determine that the relying entity is not of a type privy to this information. The assertions model manager may validate any data received in the request, such as the identifier of the relying entity, entity type data identifying the type of entity associated with the relying entity, and/or the identifier of the target entity. For purposes of illustration and not limitation, the assertions model manager may confirm that the entity type matches a predetermined entity type associated with the identifier of the relying entity. Additionally or alternatively, the assertions model manager may determine a strength/confidence score associated with the identifier of the relying entity.

In some embodiments, if the assertions model manager determines that the request is not valid, then the process may end. Additionally or alternatively, the assertions model manager may transmit a notification to the relying entity including information regarding why the request is invalid.

At step S506, if the request from the relying entity is valid, then the assertions model manager may transmit a notification to the target entity. In some non-limiting embodiments, the notification can include data identifying the relying entity, the entity type of the relying entity, the subset of the type(s) of assertion(s) requested, the strength/confidence score associated with the relying entity, or the like. The assertions model manager may further request approval from the target entity. For example, the target entity may be prompted to click a "yes" or "no" button indicating that the request is, or is not, approved by the target entity.

At step S508, the assertions model manager may determine whether the request is approved by the target entity. In some non-limiting embodiments, the assertions model manager may request and receive a confirmation from the target entity that the assertions model manager is approved to transmit response data associated with the package of assertions to the relying entity as requested. Alternatively, or additionally, the assertions model manager may determine whether the request is approved based on permission to share the data.

At step S508, the assertions model manager may transmit the package of assertions and/or update the distributed ledger. The assertions model manager may transmit the assertions data in a substantially similar fashion as described above with respect to FIGS. 3 and 4.

At step S512, the assertions model manager may update the event log. The assertions model manager may update the event log in a substantially similar fashion as described above with respect to FIG. 4.

Upon receiving the package of assertions, the relying entity may determine, based on the package of assertions, whether to proceed with an interaction. As examples, the relying entity may use the package of assertions to determine whether to proceed with a payment transaction or granting access to a location.

Advantages; Extensions

The teachings of this disclosure have a number of advantages. A relying entity can obtain assertions about an account in a secure, efficient manner. Previous solutions include using a primary account number to deposit a small amount and request confirmation from the account holder (i.e., the target entity). This has several problems. For example the primary account number is exposed. Further, the account holder must check her account history to identify the deposit amount, then convey it to the depositor. Here, on the other hand, deposit authentication may occur using an assertion without exposing sensitive information, and without any friction on the account holder. Further, the method of depositing a small amount only accounts for mistake, and not fraud. On the other hand, the techniques of the disclosure avoid transmission and storage of sensitive account information. This can prevent exposure of account details to hackers and man-in-the middle attackers, improving security.

Embodiments have a number of additional advantages. Some embodiments use assertions models customized for different types of relying entities to generate multiple assertions packages for a given target entity. The different assertions packages may be made available to different types of relying entities in a secured manner using private and public keys. As a result, only the appropriate relying entities will be able to retrieve appropriate corresponding assertions packages. These assertions packages may be generated at an initial time. By using preexisting, tailored assertions packages, the relying entities can quickly be granted an assertion. There is no need to recompute a given assertion package for multiple relying entities of a same type. Hence, computational time and resources are saved while ensuring a high degree of privacy and security.

Further, the packages of assertions may be stored as entries to a distributed ledger. Using a distributed ledger approach for the assertions provides numerous advantages. The assertion data is provable, in that entries can be attributable to specific entities cryptographically. The assertion data is non-repudiable, in that entries cannot later be altered or deleted. The assertion data is sequential, as the order of every entry is provable before, or after, every other entry. The assertion data is ubiquitous and available from any reasonable vector. The assertion data is survivable, even if large numbers of the distributed nodes fail or are under attack. The data is highly available, with high throughput. The assertion data is trustable by the entities involved.

Further, it is advantageous to generate an assertion which answers the relying entity's question on a need-to-know basis, in order to ensure privacy. For example, the system can inform the relying entity that the target entity is old enough to buy liquor without revealing the target entity's actual age, or any other information that may be revealed on a driver's license, such as the target entity's name or address. This can be taken a step further by using a clustered assertion which is based on multiple underlying assertions. For example, the relying entity may be informed that the target entity should not be granted access to a building, without revealing the answer to any of the underlying assertions used to make that determination (e.g., whether the target entity is an employee, whether the target entity has a valid security clearance, and whether the target entity is staffed on a project corresponding to the location).

The teachings of the present disclosure provide several advantages for the target entity for which information is being requested. The target entity can control privacy by customizing what information can be revealed to what relying entities. Further, various different types of information required by various relying entities is streamlined into a single channel. The target entity can simply provide an identifier (e.g., a moniker, and/or identifier of the target entity) and, based on the type of the relying entity, the appropriate information can be extracted. This can alleviate the need for the target entity to repeatedly expose sensitive account information.

The teachings of the present disclosure provide several advantages for the relying entity requesting information. First, by providing the above-referenced advantages to the target entities (e.g., customers of the relying entity, employees of the relying entity, etc.), the relying entity is providing a better experience for the target entity. In the case of a merchant, increased customer experience may lead to increased sales. Further, the teachings of the present disclosure can provide increased fraud protection by verifying data across multiple channels, using advanced cryptographic techniques.

It should be understood that any of the embodiments be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices.

Such programs may also be encoded and transmitted using carrier signals adapted for transmission via wired, optical, and/or wireless networks conforming to a variety of protocols, including the Internet. As such, a computer-readable medium according to an embodiment may be created using a data signal encoded with such programs. Computer readable media encoded with the program code may be packaged with a compatible device or provided separately from other devices (e.g., via Internet download). Any such computer-readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the embodiments will become apparent to those skilled in the art upon review of the disclosure. The scope of the embodiments should, therefore, be determined not with reference to the above description, but instead should be determined with reference to the pending claims along with their full scope or equivalents.

Although embodiments have been described in detail for the purpose of illustration based on what are currently considered to be practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

One or more features from any embodiment may be combined with one or more features of any other embodiment without departing from the teachings of this disclosure.

As used herein, the use of "a," "an," or "the" is intended to mean "at least one," unless specifically indicated to the contrary.

What is claimed is:
1. A method comprising:
receiving, by a server computer from a relying entity, a request for assertions associated with a target entity, wherein the request for assertions includes an identifier of the relying entity and a hash of an identifier of an account;
determining, by the server computer, an assertions model based on the identifier of the relying entity;
retrieving, by the server computer, a package of assertions associated with the account based on the assertions model and the hash of the identifier of the account, wherein the assertions model comprises one or more assertion values, and wherein the one or more assertion values are secure facts about the target entity that are based on, and different from, underlying identity attribute data;
encrypting, by the server computer, the package of assertions using a public key of the relying entity and a public key of the target entity; and
transmitting, by the server computer, the package of assertions to the relying entity.
2. The method of claim 1, wherein the request for assertions further comprises an identifier of the target entity associated with the account, and retrieving the package of assertions by the server computer is further based on the identifier of the target entity.
3. The method of claim 2, further comprising:
determining the target entity is associated with the account based on the identifier of the target entity and the hash of the identifier of the account.

4. The method of claim 1, wherein the assertions model specifies a plurality of assertion types, and the method further comprises:
for each assertion type, of the plurality of assertion types:
determining a type of identity attribute corresponding to the assertion type;
obtaining identity attribute data associated with the account and the type of identity attribute; and
calculating an assertion value corresponding to the assertion type based on the identity attribute data associated with the account; and
storing the assertion value.

5. The method of claim 1, wherein the identifier of the account is a human-recognizable moniker configured by the target entity associated with the account.

6. The method of claim 1, wherein the identifier of the account is a primary account number associated with the account.

7. The method of claim 1, wherein the assertions model defines assertions which the relying entity is entitled to receive.

8. The method of claim 1, wherein the package of assertions comprises an assertion that the account is configured to accept deposits.

9. The method of claim 1, wherein:
the request for assertions further comprises an identifier of the target entity associated with the account; and
the package of assertions further comprises an assertion that the account belongs to the target entity.

10. The method of claim 9, wherein the package of assertions further comprises an assertion that the target entity has had a relationship with an authorizing entity associated with the account for a threshold time period.

11. The method of claim 9, wherein the package of assertions further comprises an assertion that the target entity has current active account relationship with an authorizing entity associated with the account.

12. The method of claim 1, wherein the package of assertions associated with the account is stored in association with a token which is a substitute value for a primary account number, and the server computer refrains from storing the primary account number.

13. The method of claim 1, wherein retrieving the package of assertions associated with the account further comprises:
identifying a saved token stored in association with a hash value matching the hash of the identifier of the account; and
determining one or more assertions linked to the saved token.

14. The method of claim 1, further comprising:
receiving, from the target entity associated with the account, a primary account number;
generating a token based on at least the primary account number; and
storing the token.

15. The method of claim 1, further comprising:
calculating a strength score for the package of assertions; and
transmitting the strength score to the relying entity.

16. The method of claim 1, wherein the package of assertions comprises a singular answer based a plurality of underlying assertion values.

17. The method of claim 1, wherein the package of assertions comprises a plurality of assertion values, and at least one assertion value, of the plurality of assertion values, comprises an expiration date.

18. The method of claim 1, further comprising generating an event in an event log, the event being associated with the transmitting of the package of assertions.

19. A system comprising a server computer comprising:
a processor; and
a non-transitory computer-readable medium comprising code, executable by the processor, to implement a method comprising:
receiving, from a relying entity, a request for assertions associated with a target entity, wherein the request for assertions includes an identifier of the relying entity and a hash of an identifier of an account;
determining an assertions model based on the identifier of the relying entity;
retrieving a package of assertions associated with the account based on the assertions model and the hash of the identifier of the account, wherein the assertions model comprises one or more assertion values, and wherein the one or more assertion values are secure facts about the target entity that are based on, and different from, underlying identity attribute data;
encrypting, by the server computer, the package of assertions using a public key of the relying entity and a public key of the target entity; and
transmitting the package of assertions to the relying entity.

20. A method comprising:
transmitting, by a client computer of a relying entity to a server computer, a request for assertions associated with a target entity, wherein the request for assertions includes an identifier of the relying entity and a hash of an identifier of an account; and
receiving, from the server computer, a package of assertions associated with the account, wherein the package of assertions was retrieved by the server computer based on the hash of the identifier of the account and an assertions model determined by the server computer based on the identifier of the relying entity, wherein the assertions model comprises one or more assertion values, wherein the one or more assertion values are secure facts about the target entity that are based on, and different from, underlying identity attribute data, and wherein the server computer encrypted the package of assertions using a public key of the relying entity and a public key of the target entity.

* * * * *